United States Patent [19]

Roche et al.

[11] Patent Number: 4,645,714
[45] Date of Patent: Feb. 24, 1987

[54] CORROSION-RESISTANT SILVER MIRROR

[75] Inventors: John L. Roche; George V. D. Tiers, both of St. Paul, Minn.

[73] Assignee: Minnesota Mining and Manufacturing Company, St. Paul, Minn.

[21] Appl. No.: 685,545

[22] Filed: Dec. 24, 1984

[51] Int. Cl.⁴ .............................................. B32B 15/08
[52] U.S. Cl. .................................. 428/458; 428/461; 428/463; 428/480; 350/642
[58] Field of Search ................ 428/480, 458, 40, 461, 428/463; 350/642, 641

[56] References Cited
U.S. PATENT DOCUMENTS 3,290,203  12/1966  Antonson et al ...................... 161/4
3,681,179   8/1972  Theissen ................................ 161/4
4,226,910  10/1980  Dahlen et al. ...................... 428/336
4,288,493   9/1981  Kropp ................................. 428/350
4,307,150  12/1981  Roche ................................ 428/336
4,338,377   7/1982  Beck et al. .......................... 428/428

OTHER PUBLICATIONS

A. J. Kinloch, Journal of Materials Science, 15, 2141-2146 (1980).
E. P. Plueddemann, cf. "Coupling Agents, Primers, and Additives for Adhesion" paper No. 92.
A. J. Kinloch, op. cit., "Filler-Free Models for the Role of Organofunctional Silanes in Composites" paper No. 94.

Primary Examiner—Edith Buffalow
Attorney, Agent, or Firm—Donald M. Sell; James A. Smith; Richard E. Brink

[57] ABSTRACT

Durable, specularly reflective mirrors for solar reflectors or fluorescent lamp fixtures are formed by vapor-depositing silver on a polyester film and protectively covering it with a coating of transparent acrylate polymer containing a silver corrosion inhibitor such as glycol dimercaptoacetate. In a preferred embodiment a pressure-sensitive mounting adhesive is applied to the opposite face of the polyester film. Degradation of the polyester, and consequent bubbling of the adhesive, is reduced or eliminated by incorporating UV absorber in acrylate polymer that is applied as a second protective coating.

18 Claims, 2 Drawing Figures

CORROSION-RESISTANT SILVER MIRROR

BACKGROUND OF THE INVENTION

This invention relates to mirror constructions of the type where a specularly reflective metal layer is applied to a smooth substrate and protectively covered with a polymeric layer or coating. The invention is particularly concerned with mirrors for use in solar collectors or reflectors incorporated in lamp fixtures.

U.S. Pat. No. 4,307,150 describes and claims a solar reflector in which an opaque, specular metallized polymeric foil is protected from corrosion and weathering by a layer of an interpolymer of certain acrylate and/or methacrylate copolymers. This patent broadly hints at the use of vapor-deposited gold, silver, and copper metals to attain specularity but is primarily directed to the use of aluminum for that purpose. The aluminum is vapor-deposited on the smooth surface of a co-extruded biaxially oriented polyester foil that consists of a first polyethylene terephthalate lamina containing conventional slip agents and hence having a mildly irregular surface to facilitate winding and a second polyethylene terephthalate lamina containing no slip agent and hence having an exposed surface which is essentially optically smooth.

Silver is inherently more reflective than aluminum, the pure metals respectively reflecting approximately 98% and 91% of the light striking their surface. When incorporated in structures of the type described in U.S. Pat. No. 4,307,150, the effective reflectiveness is somewhat reduced by the presence of the protective coating, viz., to approximately 95% for silver and 85% for aluminum. The 10% greater reflectivity of silver in solar reflectors is significant, since the major cost of such reflectors resides in the hardware itself, rather than in the reflective foil which might be incorporated in them. When metallized foils of this type are utilized as reflectors in lighting fixtures, however, the 95/85 silver/aluminum relative reflectivity is repeatedly multiplied as light from the lamp in the fixture is reflected and re-reflected; as a result, perhaps a 35–50% gain in effectiveness is achieved by utilizing a reflector incorporating silver as opposed to one incorporating aluminum. (It should be noted, of course, that the white lacquered surface ordinarily found in reflectors imparts a diffuse reflectance that is less effective than any specular metal surface of equal total reflectance.)

From the foregoing discussion, it might be assumed that it would be only logical to incorporate silver in reflectors of the type described in U.S. Pat. No. 4,307,150. When this is done, however, two undesirable phenomena occur. First of all, silver is susceptible to corrosion (including the well-known tarnishing), either where pin holes in the acrylate coating occur or along the peripheral portions of the silver-coated film. Second, a thin layer of silver (unlike a thin layer of aluminum) is characterized by the presence of a spectral "window" through which ultraviolet (UV) light in the 300 to 400 nanometer wavelength region readily passes, transmission of such light peaking at approximately 325 nanometers. Ultraviolet light in this frequency range is present not only in sunlight but also in the light emitted by conventional fluorescent lamps.

Although it might be supposed that the transmission of ultraviolet light through a silver layer in constructions of the type just described would cause no problem, it has been found that such light tends to degrade the polyester substrate on which the silver is coated, releasing small bubbles of carbon dioxide gas. Since such gas cannot escape outward through the silver and acrylate protective coating, it moves inward, causing bubbles in the adhesive which commonly attaches the reflective film to a rigid support and imparting a "chicken skin" appearance that reduces the aesthetic properties of the material.

Attempts have been made to solve the problems just described by incorporating corrosion inhibitors and/or UV absorbers in the protective acrylate coating layer. Although the corrosion inhibitors ameliorate the corrosion problem, they frequently impart an unacceptable color and, in any event, offer little or no help in blocking the ultraviolet light. On the other hand, when ultraviolet light absorbers are included in the protective acrylate coating, degradation of the polyester support is prevented but the corrosion of the silver is actually exacerbated.

SUMMARY

The present invention provides silver-based mirrors that are not only highly corrosion-resistant but also, in a preferred embodiment, resistant to degradation by ultraviolet light. Products made with the invention are thus extremely useful when incorporated in either solar reflectors or reflectors in fixtures for fluorescent lights.

In its most basic form, the present invention comprises a polymeric substrate having a thin, specularly reflective layer of silver overlying it and bonded thereto. At the surface of the silver layer that is distal to the substrate, there is incorporated sufficient bound mercaptide-type sulfur to bond with a substantial fraction of the silver atoms available at the surface. Overlying the mercaptide-covered silver and firmly adherently bonded thereto is a thin layer of protective film-forming polymer, in which a soluble stable mercaptan or other mercaptide precursor can be incorporated, thereby serving as a source of the mercaptide-type sulfur bonded to the surface. Either the substrate, the film-forming polymer, or both are sufficiently transparent to visible light that the specular surface of the silver can be seen therethrough and the high inherent reflectivity of silver may be fully utilized. A product of this type is useful in constructions where a specular silver surface is desired and either there is no support to which the product is adhered or, if the product is adhered to a substrate, aesthetic appearance is not essential.

As used herein, the term "mercaptan" will be understood to include closely related molecules derived therefrom, such as disulfides and thiolesters, that are capable of reacting with the silver surface under aerobic/hydrolytic conditions to produce the selfsame mercaptide bonding to the silver. The presence of such bonded mercaptide-type sulfur can be discerned by, e.g., X-ray photoelectron spectroscopy (XPS), a well-known technique for surface analysis. For this purpose the protective layer of film-forming polymer is first removed, e.g., by dissolution, thus exposing the bonded mercaptide materials on the silver surface. It is necessary that the mercaptide-covered surface not only protect the silver from corrosion but also act as an adhesion promoter, coupling agent, or primer for the film-forming polymer.

Also, as used herein, the term "stable mercaptan" will be restricted to those mercaptans in which the alpha carbon atom (the one bearing the sulfur) is otherwise attached only to carbon and hydrogen atoms; these materials are generally highly resistant to slow hydrolytic cleavage of the carbon-sulfur bond to liberate sulfide sulfur that will, over a period of time, tarnish or discolor the silver surface and cause a loss of reflectivity.

In the presently most preferred embodiment of the invention, the polymeric substrate is a co-extruded biaxially oriented polyester foil consisting of (1) a polyethylene terephthalate lamina containing conventional slip agents and hence having a mildly irregular surface to facilitate winding and (2) a polyethylene terephthalate lamina containing no slip agent and hence having an exposed surface that is essentially optically smooth. As previously indicated, the specularly reflective layer of silver overlies this smooth surface of the coextruded film and is bonded there to. Coated over the silver is a first acrylate or methacrylate interpolymer in which is dispersed preferably approximately 0.5 to 2.5% glycol dimercaptoacetate coupling agent/primer/corrosion inhibitor, the coating weight being approximately 1 to 4 g/m². Overlying the first acrylate coating is a second acrylate coating containing an effective ultraviolet absorber such as 2-[2'-hydroxy-3',5'-di-(alpha,alpha dimethyl benzyl)-phenyl]-benzotriazole, 2-(2'-hydroxy-3',5'-di-tertiary amylphenyl)-benzotriazole, or preferably, a combination of these or other UV absorbers that are effective throughout the 300–400 nanometer range. The inclusion of the corrosion inhibitor and the UV absorber or absorbers in separate layers keep the UV absorber out of contact with the silver, thereby avoiding any possible corroding effect. A second and significant benefit of using two discrete polymer layers is that the occasional tiny pinhole voids inherent in any coating are statistically non-coincident in the double protective layers, so that voids penetrating through both coatings are virtually non-existent. The coating weight for the second layer is typically 4 to 8 g/m².

On the opposite side of the coextruded polyester support is a uniform coating, weighing about 10 to 15 g/m², of a normally tacky and pressure-sensitive adhesive, e.g., 95:5 isooctyl acrylate:acrylamide copolymer. To protect the adhesive prior to use, a conventional release liner such as a silicone-coated polyester film may be employed.

BRIEF DESCRIPTION OF THE DRAWING

Understanding of the invention will be enhanced by referring to the accompanying drawing, in which like numbers refer to like parts in the several views, and in which.

DETAILED DESCRIPTION

Figure 1:
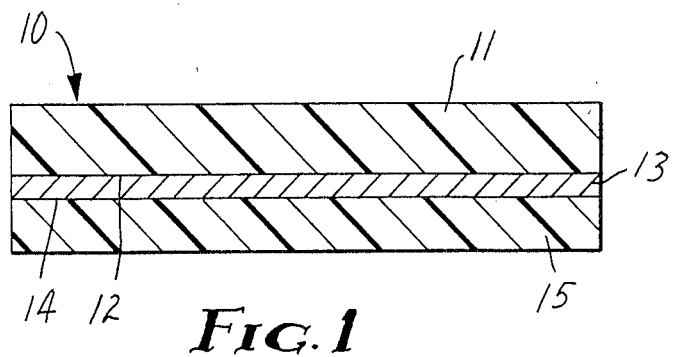
FIG. 1 is a greatly enlarged cross sectional view of the simplest form of the invention and FIG. 2 is a greatly enlarged cross sectional view of the presently preferred embodiment of the invention.

In FIG. 1, structure 10 comprises polymeric substrate 11, provided on one face with a vapor-deposited layer of silver 13, which in turn is covered by polymeric protective layer 15. Numeral 12 indicates the interface between substrate 11 and silver layer 13, while numeral 14 indicates the interface between silver layer 13 and protective layer 15. Present at interface 14 is an effective quantity of stable mercaptan, sufficient to bond with the silver atoms available at the interface. For most applications, any mercaptan selected for this application should be as nearly colorless as possible, at least in the amounts found effective to prevent corrosion. A mercaptan that imparts a visually detectable color to protective layer 15 under the desired illuminant not only reduces the efficiency of reflection by absorbing light passing to and from silver layer 13 but also changes the color value of the light rays directed at silver mirror 13. (It will, of course, be recognized that where the color imparted by the mercaptan matches the color of the light source, no problem arises. For example, where the light source is yellow, as may be the case in a room where X-ray film is being exposed and processed, a mercaptan that has a yellowish color is not objectionable.)

The stable mercaptan should have one or more polar or polarizable groups displayed at or near the opposite end of the molecule to enhance compatibility with the polymer employed in protective layer 15. If the mercaptan possesses a structure conferring low surface energy (as, for example, the alkyl chain in octadecyl mercaptan), a release surface will develop upon interface 14, effectively destroying the necessary adhesion between silver layer 13 and protective layer 15.

As has been noted, the stable mercaptan must promote adhesion to, in addition to resisting corrosion of, the silver. Although a variety of theories of adhesion have been propounded, cf. A. J. Kinloch, *Journal of Materials Science*, 15, 2141–2146 (1980), it is generally conceded that on a smooth surface, adhesion is poor unless the substrate has a higher surface energy than the adhering resin; in the present case, the substrate includes the bonded mercaptan, which must present a relatively high energy surface to the protective film-forming polymer. Specifically, it has been found that a convenient test of surface energy of the treated silver surface (from which any excess mercaptan or film-forming polymer has been removed by dissolution) may be carried out by the spreading drop technique described in U.S. Pat. No. 4,338,377, the pertinent disclosure of which is incorporated herein by reference. The disclosed test was modified by using a 1.0 microliter drop of freshly purified 1,1,2,2-tetrabromoethane instead of water as the test liquid.

It has been found that the spreading drop test, as described above, successfully distinguishes between those stable mercaptans useful as adhesion promoters within this invention and those, such as octadecyl mercaptan, which are not satisfactory. For this purpose, it is only necessary to apply the candidate mercaptan to the exposed silver surface of a vapor-coated polyester foil or glass plate, preferably from a suitable solvent, and then after an hour remove the excess (i.e., nonbonded) mercaptan by dissolution without employing any sort of scrubbing action. This treated surface is then tested as described above. Useful stable mercaptans will show a spreading drop area in excess of 6 mm², and preferably greater than 8 mm².

Exemplary stable mercaptans, as defined herein and which are workable in the practice of this invention, include mercaptoacetic acid, 3-mercaptopropionic acid, 11-mercaptoundecylic acid, thiophenol, diphenyl disulfide, N-(2-hydroxyethyl)mercaptoacetamide, 2,2'-dimercaptodiethyl ether, 2,2'-dimercapto diethyl thioether, 1,2-ethanedithiol, and 3-mercaptopropyl trimethoxysilane, all of which show spreading drop areas substantially in excess of 6 mm². Preferred stable mercaptans include glycol bis(3-mercaptopropionate), trimethylolpropane tris(3-mercaptopropionate), and especially glycol dimercaptoacetate, all of which show spreading drop values in excess of 8 mm². Stable mercaptans that fail to provide the necessary priming action, and thus are not workable in practicing the present invention, include octadecyl mercaptan, dicetyl disulfide, and octadecyl thioglycolate, all of which show spreading drop values substantially below 6 mm².

In practicing the present invention, it is further preferred to use those mercaptans that, in accordance with the entanglement theory of E. P. Plueddemann (cf. "Coupling Agents, Primers, and Additives for Adhesion," Paper No. 92 presented at the 1984 meeting of the American Chemical Society, Division of Polymeric Materials Science and Engineering, held in St. Louis, Mo. cf. also Kinloch, op. cit. and Barry Arkles & Carlos Cerreno, "Filler-Free Models for the role of Organofunctional Silanes in Composites," Paper No. 94 presented at the aforementioned 1984 American Chemical Society meeting) are capable of forming interpenetrating polymers with passage of time when codeposited in a solution of the film-forming polymer. Such mercaptans include, among others, di- and polymercaptans; under atmospheric exposure, subsequent to application of the protective film-forming polymer, these aerobically reactive mercaptan compounds will couple to form interpenetrating polymer bonded to the surface layer, resulting in improved adhesion, especially under adverse environmental conditions.

The practical lower limit for the amount of mercaptan required to impart adequate corrosion resistance is, of course, dependent on the specific manufacturing process employed. Where the mercaptan is included in a toluene solution of acrylate polymer, for example, bonding to the surface of the silver occurs rapidly during coating and subsequent oven drying. If, after coating, the structure were to be stored above the glass transition temperature of the acrylate, a slow migration of mercaptan to the silver surface would be expected. Taking all factors, including coating weight, into account, it is believed that 0.001% to 0.005% would be the lowest theoretical concentration of glycol dimercaptoacetate at which effective corrosion protection might be obtained. Because of the competing polymerization and oxidation reactions, however, there is a natural and practical lower limit well above these values, e.g., about 0.1%; for most practical manufacturing purposes it has been found preferable to employ a concentration of 0.5% to 2.5%, and most preferably 1.0% to 1.8%. Too high a concentration of mercaptan is undesirable, not only because of an increasing tendency to impart possibly undesirable color but also because of an increasing tendency to plasticize and soften the protective polymeric coating to an unacceptable degree.

Because clarity, flexibility, abrasion resistance, transparency, and resistance to environmental degradation are all extremely desirable attributes of silver mirrors, the polymer in protective layer 15 is preferably an interpolymer of monomers consisting essentially of (1) about 50–70% monomers selected from the class consisting of methyl methacrylate and ethyl methacrylate and (2) correspondingly about 30–50% monomers selected from the class consisting of butyl acrylate, butyl methacrylate, and 2-ethylhexyl acrylate. Particularly satisfactory polymers include an acrylic polymer that is believed to be a 64:36 methyl methacrylate:butyl acrylate copolymer, a 45% toluene solution of which is commercially available from Rohm and Haas Company under the trade designation "Acryloid" B-50S. A similarly effective polymer is one that is believed to be a 62.4:36.2:1.4 methyl methacrylate:butyl acrylate:acrylic acid terpolymer, a 45% toluene solution of which is commercially available from Rohm and Haas Company under the trade designation "Acryloid" B-48S.

Figure 2:
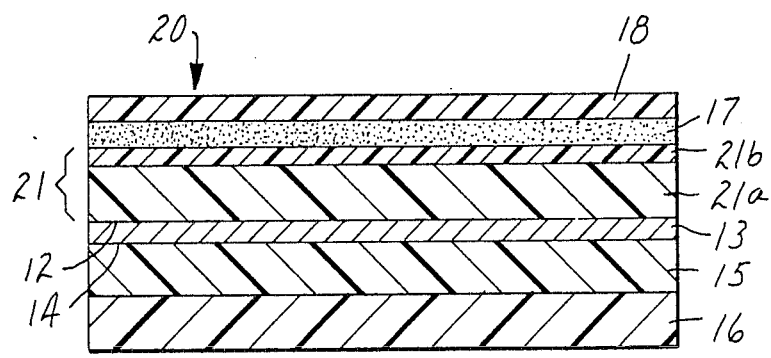

Structure 20, depicted in FIG. 2 of the drawing, is the presently preferred embodiment of the invention. In this construction, silver layer 13 is vapor-deposited on the smooth surface of a co-extruded biaxially oriented polyester foil 21, consisting of (1) polyethylene terephthalate lamina 21b, which contains conventional slip agents and hence has a mildly irregular surface to facilitate winding and (2) polyethylene terephthalate lamina 21a, which contains no slip agent and hence has an exposed surface that is essentially optically smooth.

On the opposite surface of lamina 21b is normally tacky and pressure-sensitive adhesive layer 17, which in turn is protectively covered by release liner 18 prior to use. When structure 20 is to be mounted on a surface that is to be reflectorized (e.g., the interior surface of the reflector base behind a fluorescent lamp), release liner 18 is removed and adhesive layer 17 used to firmly attach structure 20 to the reflector base. The present material of choice for substrate 21 is, as previously indicated, polyethylene terephthalate, which is, however, susceptible to giving off carbon dioxide gas when exposed to ultraviolet light. Since the small bubbles of carbon dioxide are unable to pass through silver layer 13 and protective layer 15, they tend to permeate adhesive layer 17, where they create a "chicken skin" effect that reduces the attractiveness of the construction. This effect can, however, be substantially eliminated by applying, over the surface of protective polymeric layer 15, a second polymeric layer 16 containing one or more ultraviolet light absorbers effective in the 300 to 400 nm range; a presently preferred combination consists of equal amounts of 2-[2'-hydroxy-3',5'-di(alpha,alpha-dimethylbenzyl)phenyl]benzotriazole and 2-(2'-hydroxy-3'5'-di-tertiary-amylphenyl)-benzotriazole, (respectively commercially available from CIBA-GEIGY Corp. under the trade designations "Tinuvin" 234 and "Tinuvin" 328).

Understanding of the invention will be further enhanced by referring to the following illustrative but non-limiting example, in which all parts are by weight unless otherwise noted.

EXAMPLE 1

A 50-micrometer co-extruded biaxially oriented polyester foil was obtained, the foil consisting of (1) a 12-micrometer polyethylene terephthalate lamina containing conventional slip agents and hence having a mildly irregular surface to facilitate winding and (2) a 38-micrometer polyethylene terephthalate lamina containing no slip agent and hence having an exposed surface which was essentially optically smooth. On the smooth surface was then vapor-deposited approximately 0.08–0.1 micrometer of silver to provide an opaque specular metallic surface. Using reverse roll coating techniques, a 15% toluene solution of the aforementioned "B-48S" acrylate polymer in which had been dissolved 1.0% glycol dimercaptoacetate based on the acrylate polymer, was applied and the solvent evaporated by drying in a 105° C. oven for 4 minutes to leave a dry coating, weighing approximately 2.5 g/m². To a separate 25% toluene solution of the "B-48S" was then added 5% "Tinuvin" 234 UV absorber and 5% "Tinuvin" 328 UV absorber, all percentages being based on the acrylic polymer present. Again using reverse roll coating techniques, the second acrylic polymer solution was applied over the first acrylic polymer coating and the solvent evaporated by drying in a 105° C. oven for 4 minutes to leave a second dry coating, weighing approximately 6.5 g/m².

To determine whether the adhesion between the silver and the polyester support film and the adhesion between the first acrylic coating and the silver were both adequate, a simple test was performed. Using a straightedge and a razor blade, the coated surface was crosshatched with scribed lines drawn at a spacing of approximately 6.4 mm. A commercially available pressure-sensitive adhesive tape product, having a cellulose acetate foil backing and a 95.5:4.5 isooctyl acrylate:acrylic acid copolymer adhesive, was applied over the crosshatched surface and rubbed down to ensure uniform contact. The tape was then doubled back on itself at 180° and removed by hand at estimated rates of 2.5 to 25 cm/sec. It was found that the tape stripped free cleanly, and no separation occurred at either the interface between the smooth polyester lamina and the silver or the interface between the silver and the mercaptan-containing acrylic coating.

For many purposes, as has been previously indicated, it is desirable to provide a means for adhering the reflective sheeting to various substrates. Accordingly, the uncoated polyester surface of the product of this example was coated with a 25% methyl ethyl ketone solution of a 95:5 isooctyl acrylate:acrylamide copolymer and the solvent evaporated in a 93° C. oven for five minutes to leave a dried adhesive coating weighing approximately 13.5 g/m². The product was then wound in roll form, a silicone-coated release liner being interleaved between adjacent convolutions to prevent the adhesive on one face from adhering to the acrylate coating on the other face. The roll could then be readily unwound and the adhesive used to mount the reflective sheeting on a desired substrate. If desired, inadvertent marring of the outermost acrylic coating prior to installation of the film may be prevented by applying thereover a premask film of polypropylene approximately 12 micrometers thick.

Environmental factors have a strong influence on the life and long term performance of silver reflective films. Compounds containing sulfur result primarily from fossil fuel combustion in urban areas, and chlorine compounds are particularly evident in coastal areas.

To best simulate these natural silver corrosion agents, accelerated tests are used to determine the most promising research directions and to estimate product life in actual use.

Subjection of a silver reflector to 5% salt fog in a chamber maintained at about 40° C. quickly causes attack upon the unprotected edges or at any discontinuity in the protective polymer coating or coatings. Silver reflective control films having no anti-corrosion agents in their polymer coatings usually exhibit preliminary corrosion failure after as little as 30 minutes, and they are totally whitened and corroded by 8 to 12 hours of exposure. The product of the foregoing example exhibited only slight whitening after 36 hours, indicating a useful lifetime of 10 to 15 times that of the control.

The corroding effect of sulfur can be simulated and greatly accelerated by applying aqueous ammonium sulfide at a small ⅛" razor slit made through the film after it is adhered to a rigid substrate. Two or three drops of the liquid are placed so as to cover the slit and the elapsed time is noted when the beginning of corrosion is evident at the slit edges. The diameter of the advancing corrosion front is noted at discrete time intervals and these time/diameter relationships are used to rate various samples. In control samples without anti-corrosion agents in the polymer coating, the spread of corrosion is evident within 15 seconds after the application of the corrosive liquid. The product of the foregoing example evidenced no corrosion until 3 to 5 minutes had elapsed.

To predict whether bubbling in the adhesive layer will occur, control samples, with no UV absorbers in their second polymer coating, and the product of this example were placed in intense UV light generated by Westinghouse FS-40 lamps. Within 24 hours, bubbling of the adhesive layer of the control samples was detected. In sharp contrast, the product of this example evidenced no bubbling, even after as much as 1000 hours.

The ability of the product to withstand outdoor exposure was then evaluated in accordance with ASTM Test No. G53-77, an accelerated weathering test in which the sample was continuously subjected to a temperature of 50° to 60° C. at relative humidity in excess of 90%, ultraviolet light (280-350 nanometers) being directed onto the coated surface at an intensity of approximately 500 watts/m² for 4-hour periods alternating with 4-hour periods of darkness. No bubbling was apparent after 1000 hours.

For some purposes, it has been found desirable to provide a means for adhering the reflective sheeting to various substrates. Accordingly, the uncoated (polyester) surface of the product of this example was coated with a 25% methyl ethyl ketone solution of a 95:5 isooctyl acrylate:acrylamide copolymer and the solvent evaporated in a 93° C. oven for 5 minutes to leave a dried adhesive coating weighing approximately 13.5 g/m². The product was then wound in roll form, a silicone-coated release liner being interleaved between adjacent convolutions to prevent the adhesion from adhering to the acrylate coating. The roll could then be readily unwound and the adhesive used to mount the reflective sheeting on a desired substrate.

It will be appreciated that the foregoing teaching is subject to considerable variation without departing from the spirit of the invention. Thus, for example, as protective coatings over the silver, it may be possible to use suitably stabilized polymers or copolymers of vinyl fluoride or vinylidene fluoride, as well as polypropylene and polyethylene, all of which are transparent to ultraviolet light. A Uv absorber suitable for incorporation in the protective coating is any single type of molecule (or combination of different types of molecules) effective to absorb ultraviolet radiation throughout the significant portion of the 300-400 nm wave length.

It will similarly be apparent that those with ordinary skill in the art can apply the principles of the invention to the manufacture of transparent-reflective energy control films, e.g., of the types described in U.S. Pat. Nos. 3,290,203, 3,681,179, 4,226,910, and 4,288,493.

We claim:

1. A highly reflective and corrosion-resistant mirror comprising in combination:
   a. a polymeric substrate,
   b. a thin, specularly reflective layer of silver overlying said substrate and bonded thereto,
   c. at the surface of the silver layer that is distal to said substrate, sufficient bound mercaptide-type sulfur to bond with a substantial fraction of the available silver atoms, and d. a thin protective layer of film-forming polymer overlying said distal surface and firmly adherently bonded thereto, at least one of said substrate and said film-forming polymer being transparent to visible light so that the specular surface of the silver can be seen therethrough.

2. The mirror of claim 1 wherein the substrate is a polymeric film.

3. The mirror of claim 2 wherein the film consists essentially of biaxially oriented polyethylene terephthalate.

4. The mirror of claim 3 wherein the film consists of a first lamina containing conventional slip agents and a second lamina containing no slip agent, the silver being bonded to the second lamina.

5. The mirror of claim 1 wherein the film-forming polymer is transparent to visible light.

6. The mirror of claim 5 wherein a stable mercaptan is dissolved in the layer immediately contacting the distal surface of the silver.

7. The mirror of claim 6 wherein the surface of the mercaptide-bonded silver shows a spreading drop area of at least about 6 mm$^2$.

8. The mirror of claim 7 wherein the surface of the mercaptide-bonded silver shows a spreading drop area of at least about 8 mm$^2$.

9. The mirror of claim 6 wherein the layer immediately contacting the distal surface of the silver is the film-forming polymer.

10. The mirror of claim 9 wherein the film-forming polymer contains glycol dimercaptoacetate.

11. The mirror of claim 10 wherein the film-forming polymer is an acrylate interpolymer.

12. The mirror of claim 11 wherein the film-forming polymer is a polymer formed from acrylate monomers selected from lower acrylates and lower methacrylates.

13. The mirror of claim 1 wherein the film-forming polymer is formed from monomers consisting essentially of (a) about 50 to 70% methyl methacrylate, ethyl methacrylate, or both and (b) correspondingly about 50 to 30% monomers selected from the class consisting of butyl acrylate, butyl methacrylate, and 2-ethyl hexyl acrylate.

14. The mirror of claim 10 wherein the substrate is biaxially oriented polyethylene terephthalate having an adhesive on the surface opposite that on which the silver is applied.

15. The mirror of claim 14 wherein the adhesive is a normally tacky and pressure-sensitive adhesive.

16. The mirror of claim 15 wherein a second film-forming polymer containing UV absorber is applied over the first film-forming polymer.

17. The mirror of claim 16 wherein the UV absorber comprises approximately equal parts of 2-[2'-hydroxy-3',5'-di-(alpha,alpha-dimethylbenzyl)phenyl]-benzotriazole and 2-(2'-hydroxy-3',5'-di-tertiaryamylphenyl)-benzotriazole.

18. The mirror of claim 17 wherein a premask film of polypropylene protectively covers the outer acrylate polymer layer to afford protection prior to installation.

* * * * *